(12) United States Patent
Ahmed

(10) Patent No.: US 8,554,761 B1
(45) Date of Patent: Oct. 8, 2013

(54) TRANSFORMING A SINGLE-TABLE JOIN PREDICATE INTO A PSEUDO-JOIN PREDICATE

(75) Inventor: Rafi Ahmed, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 13/481,722

(22) Filed: May 25, 2012

(51) Int. Cl.
  *G06F 17/30* (2006.01)
  *G06F 7/00* (2006.01)
(52) U.S. Cl.
  USPC ........................................ 707/714; 707/802
(58) Field of Classification Search
  USPC .................................. 707/714, 802
  See application file for complete search history.

(56) References Cited

U.S. PATENT DOCUMENTS

| | | | |
|---|---|---|---|
| 6,615,203 B1 * | 9/2003 | Lin et al. | 1/1 |
| 2004/0220923 A1 * | 11/2004 | Nica | 707/3 |
| 2005/0097099 A1 * | 5/2005 | Kapoor et al. | 707/3 |
| 2006/0230017 A1 * | 10/2006 | Larson et al. | 707/2 |
| 2009/0019001 A1 | 1/2009 | Thiyagarajan et al. | |
| 2009/0292669 A1 | 11/2009 | Ahmed et al. | |
| 2011/0125696 A1 | 5/2011 | Wu et al. | |
| 2011/0231422 A1 | 9/2011 | Rawlings et al. | |

OTHER PUBLICATIONS

U.S. Appl. No. 13/552,419, filed Jul. 18, 2012, Notice of Allowance, mailed May 28, 2013.
U.S. Appl. No. 13/491,391, filed Jun. 7, 2012, Notice of Allowance, mailed Jul. 8, 2013.

* cited by examiner

*Primary Examiner* — Kuen Lu
(74) *Attorney, Agent, or Firm* — Hickman Palermo Truong Becker Bingham Wong LLP

(57) ABSTRACT

Methods, computing devices, and computer-readable media are provided for transforming an initial query with a single-table outer join predicate to a second, semantically equivalent query that includes a multi-table predicate instead of the single-table outer join predicate. Because the second query does not include the single-table outer join predicate, the second query may be available for further transformations or optimization techniques, may produce a more efficient or otherwise different execution plan, or may be executed more efficiently or differently. The single-table outer join predicate may be in a full outer join ON clause of the initial query or nested in a left outer-joined LATERAL VIEW of the initial query. The multi-table predicate may be in a WHERE clause of the second query. Unlike the initial query, the second query allows use of a temporary organization of data from multiple tables for evaluation of multiple rows of the left outer join.

44 Claims, 3 Drawing Sheets

---

RECEIVE A FIRST QUERY THAT INCLUDES A SINGLE-TABLE PREDICATE THAT IS PART OF A FIRST OUTER JOIN
100

↓

TRANSFORM THE FIRST QUERY INTO A SEMANTICALLY EQUIVALENT SECOND QUERY THAT INCLUDES A MULTI-TABLE PREDICATE CORRESPONDING TO THE SINGLE-TABLE PREDICATE
102

↓

CAUSE EXECUTION OF THE TRANSFORMED QUERY OR A SEMANTICALLY EQUIVALENT THIRD QUERY THAT HAS BEEN TRANSFORMED BEYOND THE TRANSFORMED QUERY
104

TRANSFORMING A SINGLE-TABLE JOIN PREDICATE INTO A PSEUDO-JOIN PREDICATE

TECHNICAL FIELD

The technical field relates to rewriting and optimizing queries.

BACKGROUND

Query Processing

A query is an expression, command, or set of commands that, when executed, causes a server to perform an operation on a set of data. A query may specify a join operation that combines rows from two or more sources, such as tables, views, or snapshots. In the context of database systems, a join is performed whenever multiple tables ("base tables") appear in a FROM clause of a query. For some join operations, the first table in the join operation may be called the "left table," and the second table in the join operation may be called the "right table." The join operation produces a result set that may be stored temporarily, used in evaluating other queries, or written as a new table in a database. The result set is often stored temporarily so that other parts of the query may select data from the result set.

A query may be processed in a predictable order by query processors. For example, the order of precedence may be FROM, WHERE, GROUP BY, HAVING, SELECT, and ORDER BY . . . . Query processors may vary the order if varying the order is predicted to be more efficient as long as the varying the order would not change a result of the query.

The rows on which a join operation is to be performed or the result of performing a join operation may be reduced or filtered if there are conditions in a WHERE clause of the query. Filters in the WHERE clause may have been specified by a user who authored the query or may result from transformations by a query optimizer. Filters such as these that are performed separately from the join operation are called "filter predicates." Filter predicates remove rows if the rows do not satisfy the filter predicate conditions. For example, a filter predicate may remove rows for employees that are not in department 3. The conditions in the filter predicate may be related to each other with logical operators such as AND (for "conjunctive predicates") or OR (for "disjunctive predicates"). The application of filter predicates may cause certain types of results to remain in the result set, such as results that would be included for an inner join (removal of non-matching rows from the left and right tables), a left outer join (removal of non-matching rows from the right table), a right outer join (removal of non-matching rows from the left table), or a subset of the rows that would be produced by separately performing a join operation.

A join predicate identifies condition(s) on which a join operation is based. Join predicates are applied as the join operation is being performed rather than being applied before or after the join operation has been performed. The join predicate may be specified in an ON clause as shown in example Queries 2, 3, and 5 below or in a WHERE clause as shown in example Queries 7, 8, and 9 . . . . Unlike filter predicates, join predicates are evaluated on a row-by-row basis as the join operation is performed on the row to generate the result set. Based on whether or not the row satisfies the join predicate, the row may be included in, duplicated, excluded from, or null-padded. The evaluation of complex join predicates may be computationally expensive because join predicates are re-evaluated for each row that is joined.

A single-table join predicate is a join predicate that references a single table or other data object. For example, the single-table join predicate may be compared to a static value such as $50,000. A multi-table join predicate is a join predicate that references multiple tables or other data objects, such as in an equality condition. An example equality condition that references multiple tables is A.x=B.y, where A and B are tables, x is a column of A, and y is a column of B. For full outerjoin and left outerjoin, a single-table join predicate cannot be treated as a filter predicate because join predicates may null-pad the result set rather than merely removing rows from the result set.

In query optimization, queries may be transformed from one form to another form as long as the two forms are semantically equivalent to each other. As used herein, a query is "transformed" when the query is (a) rewritten from a first form to a second form, (b) received in a manner that specifies a first set of operations, such as a first form or a first execution plan, and executed using a second set of operations, such as the operations specified by a second form or second execution plan, or (c) received in a manner that specifies a first set of operations, and planned for execution using a second set of operations. An execution plan is information, such as a query tree structure, that is prepared for an execution engine. Two queries or execution plans are semantically equivalent to each other when the two queries or execution plans, if executed, would produce equivalent result sets, even if the result sets are assembled in different manners by the two queries or execution plans. Execution of a query is semantically equivalent to a query or execution plan if the query execution produces a result set that is equivalent to the one that would be produced by the query or execution plan, if executed.

Complex join predicates may create computationally expensive problems that are unsolved by current optimization techniques. These problems may be compounded in complex queries that include multiple join operations and multiple join predicates. Execution of such queries may take hours or even days, while consuming valuable computational resources. Such problems may deter customers from purchasing one server or optimization product over another product if the other product were to solve these problems. Further, optimization techniques cannot merely transform a join predicate into a filter predicate because such a transformation is not guaranteed to be semantically equivalent.

Join Operations

The manner in which tables are joined can affect the outcome of the query. Example types of join operations include inner join, left outer join, right outer join, full outer join, natural join, and cross join. Example methods of join include hash, sort-merge, index access, and nested-loops joins. The type of join operation may be specified in the FROM clause or in the WHERE clause of the query. The method of join is generally left up to the query optimizer to determine, for example, based on a cost-analysis of the methods available for the query.

A cross-join produces a result set that is a Cartesian product of all rows in the sources. In other words, for a cross-join of T1 and T2, every row in source table T1 would be combined with every row of source table T2. Computing the Cartesian product is an expensive operation that uses an order of n*m resources to compute, where n is the number of rows in table T1 and m is the number of rows in table T2.

If the specified type of join is not a cross-join, computation of the join operation may avoid the complex computation of a Cartesian product of all rows in the sources. Many database systems support American National Standards Institute ("ANSI") syntax for specifying types of joins that are performed on the tables. Different types of joins often produce different result sets by including, duplicating, excluding, or null-padding different sets of rows from the sources. A row is said to be "null-padded" if values in the row are changed to null. A row may be null-padded if the row is included in the result set even though the row does not satisfy a join predicate.

For example, an inner join produces a result set that includes only the matching rows (i.e., the rows that satisfy the predicate). An example syntax for an inner join is provided in Query 1 below.

Query 1: Example Syntax for an Inner Join
SELECT T1.SSN, T1.name, T2.dname
FROM T1, T2
WHERE T1.dno=T2.id For inner joins such as this one, the predicate in the WHERE clause may be treated as either a join predicate or a filter predicate—the placement of the predicate does not change the result set. The optimizer may choose to evaluate this query by applying the predicate as part of the join operation or separately from the join operation as a filter predicate on the result of the Cartesian product of the two tables. The join predicate in this example produces the results shown in Table 1, where rows from T1 are said to match rows from T2 if the value of the department number ("dno") column in T1 matches the value of the "id" column in T2. If the rows match, the values for that row from T1 and for that row from T2 are added to the result set. Unlike outer joins, rows from T1 that do not have a matching row in T2 are not added to the result set. Also unlike outer joins, rows from T2 that do not have a matching row in T1 are not added to the result set.

TABLE 1

ROWS RESULTING FROM
AN EXAMPLE INNER JOIN

| COLUMN(S) FROM T1 | COLUMN(S) FROM T2 |
|---|---|
| ROWS FROM T1 AND T2 THAT MATCH | |

Query 2 uses the ANSI syntax "INNER JOIN" to signal the inner join, but Query 2 is semantically equivalent to Query 1—the two queries, if executed, would produce the same result set that is shown in Table 1.

Query 2: Example Syntax for the Inner Join
SELECT T1.SSN, T1.name, T2.dname
FROM T1 INNER JOIN T2
ON T1.dno=T2.id A full-outer join is one type of outer join. The full-outer join produces a result set that includes matching rows and null-padded non-matching rows. In other words, rows that do not satisfy the predicate are null-padded rather than excluded altogether. An example syntax for a full outer join is provided in Query 3 below.

Query 3: Example Syntax for a Full Outer Join
SELECT T1.SSN, T1.name, T2.dname
FROM T1 FULL OUTER JOIN T2
ON (T1.dno=T2.id)

Query 3 is not equivalent to Query 1 or Query 2. In Query 3, the "FULL OUTER JOIN" operator signals that the join operation is a full outer join. The join predicate in this example produces the results shown in Table 2, where rows from T1 are said to match rows from T2 if the value of the department number ("dno") column in T1 matches the value of the "id" column in T2. If the rows match, the values from the SSN and name columns for that row from T1 and the department name ("dname") column for that row from T2 are added to the result set. Rows from T1 that do not have a matching row in T2 are also added to the result set, except that the column(s) from T2, such as "dname" in the example, are null-padded for those rows. Similarly, rows from T2 that do not have a matching row in T1 are added to the result set, except that column(s) from T1, such as "SSN" and "name" in the example, are null-padded for those rows.

TABLE 2

ROWS RESULTING FROM
AN EXAMPLE FULL OUTER JOIN

| COLUMN(S) FROM T1 | COLUMN(S) FROM T2 |
|---|---|
| ROWS FROM T1 THAT DO NOT MATCH T2 | NULL VALUES |
| ROWS FROM T1 AND T2 THAT MATCH | |
| NULL VALUES | ROWS FROM T2 THAT DO NOT MATCH T1 |

A left outer join is another type of outer join. The left outer join produces a result set that includes matching rows and null-padded non-matching rows for the left table but not for the right table. In other words, rows from the left table that do not satisfy the join predicate are null-padded; whereas, rows that do not satisfy the predicate in the right table are excluded. An example syntax for a native left outer join is provided in Query 4 below, where the left outer join is signaled by the "(+)".

Query 4: Example Syntax for a Left Outer Join
SELECT T1.SSN, T1.name, T2.dname
FROM T1, T2 (+)
WHERE T1.dno=T2.id(+)

Query 4 is not semantically equivalent to any of Queries 1-3. The join predicate in this example produces the results shown in Table 3, where rows from T1 are said to match rows from T2 if the value of the department number ("dno") column in T1 matches the value of the "id" column in T2. If the rows match, the values for that row from T1 and for that row from T2 are added to the result set. Rows from T1 that do not have a matching row in T2 are also added to the result set, except that the column(s) from T2, such as "dname" in the example, are null-padded for those rows. Unlike a full outer join, rows from T2 that do not have a matching row in T1 are not added to the result set.

TABLE 3

ROWS RESULTING FROM
AN EXAMPLE LEFT OUTER JOIN

| COLUMN(S) FROM T1 | COLUMN(S) FROM T2 |
|---|---|
| ROWS FROM T1 THAT DO NOT MATCH T2 | NULL VALUES |
| ROWS FROM T1 AND T2 THAT MATCH | |

Query 5 uses the ANSI syntax for "LEFT OUTER JOIN" to signal the left outer join, but Query 5 is semantically equivalent to Query 4—the two queries, if executed, would produce the same result set that is shown in Table 3. Queries 4 and 5 are not semantically equivalent to Queries 1-3.

Query 5: Example Syntax for the Left Outer Join
SELECT T1.SSN, T1.name, T2.dname
FROM T1 LEFT OUTER JOIN T2
ON T1.dno=T2.id The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
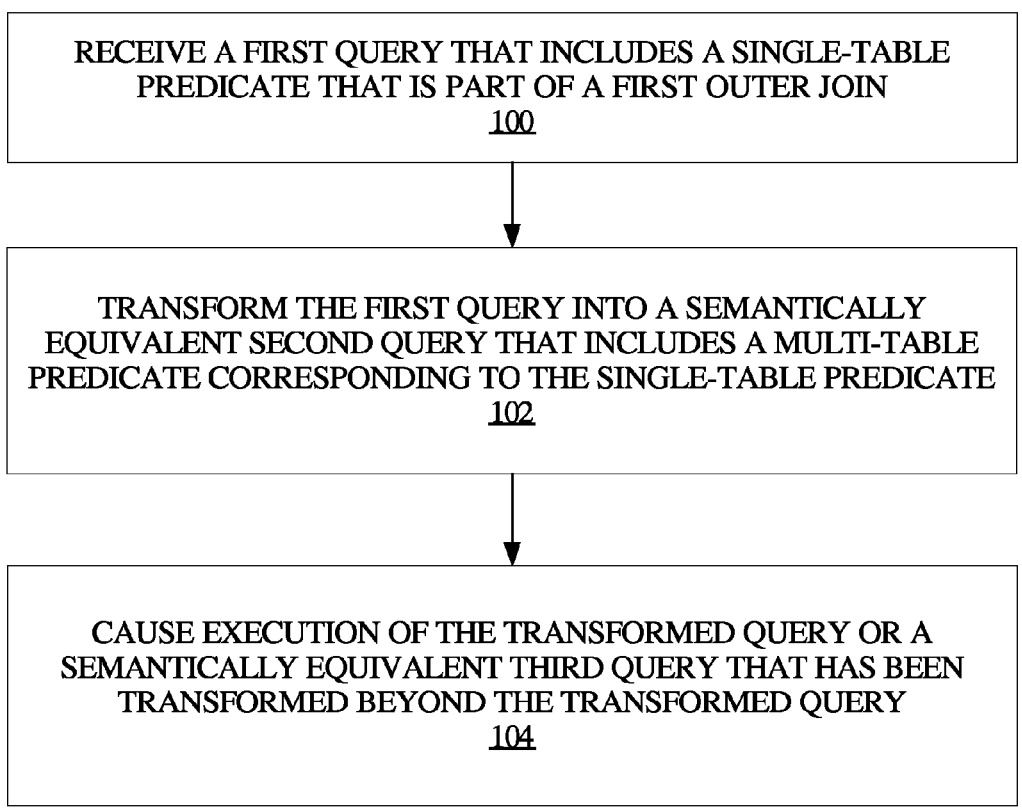
FIG. 1 illustrates an example process for transforming a query with a single-table outer join predicate to a second, semantically equivalent query that includes a multi-table predicate instead of the single-table outer join predicate.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for transforming an initial query with a single-table outer join predicate to a second, semantically equivalent query that includes a multi-table predicate instead of the single-table outer join predicate. Because the second query does not include the single-table outer join predicate, the semantically equivalent query may be available for further transformations or further optimization techniques, may produce a more efficient or otherwise different execution plan, or may be executed more efficiently or differently. The single-table outer join predicate may be in an ON clause of the initial query or nested in a LATERAL VIEW of the first query. The multi-table predicate may be in a WHERE clause of the second query.

Unlike the initial query, the second query allows a temporary organization of data from multiple tables to be utilized for evaluation of multiple rows of the left outer join. For example, the initial query, if executed, may cause generation of a lateral view for each row of the join operation. The second query, if executed, may cause generation of sorted data or a hash table. During execution of the query, the sorted data (for the sort merge method) or the hash table (for the hash join method) may be preserved in memory, on disk, or partially in memory and partially on disk, and may be used during execution to determine whether multiple rows satisfy conditions of the join. Because a pseudo-join operator references both tables, the pseudo-join operator may take advantage of the sorted data or the hash table without reconstructing the sorted data or the hash table for each row.

The techniques may be implemented as steps that are performed by computing device(s). The computing device(s) may be specially configured to perform the steps, for example, by including specialized hardware and/or specialized software. Alternatively, one or more non-transitory computer-readable media may store specialized instructions for causing computing device(s) to perform the steps.

If an initial query includes an outer join and filter predicate(s), null-padded rows are not preserved in the result set if a filter predicate (such as a predicate in the WHERE clause) places a condition other than "is null" on the null-padded portions of the rows. A query that includes a full outer join of tables T1 and T2 can be expressed as a query with a left outer join of tables T1 and T2 if the query includes a filter predicate that places a condition other than "is null" on the joined portion of table T2 (also called a filter predicate that "belongs to" T2). Similarly, the full outer join can be expressed as a right outer join of tables T1 and T2 if the query includes a filter predicate that places a condition other than "is null" on the joined portion of table T1. Also, the full outer join can be expressed as an inner join if the query includes filter predicates that place conditions other than "is null" on the joined portions of tables T1 and T2. Expressing a full outer join as a left outer join, a right outer join, or an inner join may allow more efficient execution of the query or further transformation of the query.

In one embodiment, an initial query with a single-table join predicate in a full outer join condition of two tables is transformed into a query with a special full-outer joined view containing the two tables. If a filter predicate places a condition other than "is null" on the right table, T2, the full-outer joined view can be expressed as and is equivalent to a left outer joined lateral (correlated) view. A lateral view is an inline view, or a view defined in the query itself, that references other table(s) that precede the lateral view in the FROM clause. The lateral view is said to be correlated with other table(s) because the lateral view includes predicate(s) that reference the other table(s) that precede the lateral view in the FROM clause. This type of view uses the nested-loop join method and is generally not mergeable. The nested-loop join method is executed using two nested loops. For a nested-loop join of T1 and T2, an outer loop of the join operation may iterate on records of T1, and an inner loop of the join operation may iterate on records of T2. Computing a nested loop join uses an order of n*m resources to compute, where n is the number of rows in table T1 and m is the number of rows in table T2. An unmerged lateral view cannot use a native join operator such as "(+)"; thus, a query containing an unmerged lateral view is executed using nested-loop join method that is often effectively equivalent to the computationally expensive cross join operation.

In one embodiment, if a query includes single-table predicates in a full outer join, the query can be transformed into a transformed query with a left outer join or an inner join. The transformed query has predicates on the WHERE clause. For example, transformation to a query with a left outer join may occur if filter predicate(s) place condition(s) other than "is null" on a right table. Transformation to a query with an inner join may occur if filter predicate(s) place condition(s) other than "is null" on both a right table and a left table. If there are single-table join predicates that appear as part of the ON clause and belong only to the left table, these join predicates may be converted into multi-table predicates that appear in the WHERE clause. If the original query contains a left outer joined lateral view, the lateral view may be merged, and the left outer join may be expressed in terms of a native left outer join operator such as "(+)". Native left outer joins may be executed using hash, sort-merge, index access, or nested-loops join methods; whereas, full outer joins are executed using the hash join method and lateral views are executed using the index-access or nested-loops join methods. Queries that contain left outer joins may be available for a greater number of, more efficient, or otherwise different execution techniques than queries that contain full outer joins or lateral views.

As used herein, the term "pseudo-join predicate" refers to a predicate that references two database objects to apply a condition to one of the database objects. The pseudo-join predicate may be based on an original predicate that appeared in an ON clause or was nested in a LATERAL VIEW of an original query, allowing elimination of the ON clause or the LATERAL VIEW. The original predicate may have specified a condition on a single database object, and the pseudo-join predicate may preserve that condition even though the pseudo-join predicate references multiple database objects. By referencing multiple database objects that are being joined, the pseudo-join predicate may preserve null-padded rows that would be preserved in an outer join operation even if the pseudo-join predicate occurs in the WHERE clause with filter predicates. In one example, a pseudo-join predicate corresponding to a predicate that was originally in a LATERAL VIEW instead references a left outer join for an outer query not inside the LATERAL VIEW. In another example, a pseudo-join predicate corresponding to a predicate that was originally in an ON clause instead references a left outer join for an outer query not inside the ON clause.

In one embodiment, a first query includes a single-table join predicate that appears in an outer join. For example, the single-table join predicate may appear in an ON clause of a full outer join or in a WHERE clause nested in a left outer-joined lateral view. The first query is transformed into a transformed, semantically equivalent, query without the single-table predicate. The transformed query includes a pseudo-join predicate that references multiple tables that were being joined by the first query. The transformed query joins the same tables as the first query, but, unlike the single-table join predicate in the first query, the pseudo-join predicate in the transformed query does not appear in a LATERAL VIEW or in an ON clause. In one embodiment, multiple single-table predicates appear in the first outer join, and the transformed query might not include any of the single-table predicates. Instead, the transformed query may include corresponding pseudo-join predicates that reference multiple tables.

In one embodiment, the outer join in the original query is a full outer join of a first database object and a second database object, and the pseudo-join predicate is for a left outer join of the first database object and the second database object. In another embodiment, the outer join in the original query is a left outer join on a lateral view. The original predicate may appear in the lateral view before the original query is transformed into the transformed query. Transforming the original query to the transformed query may include converting the first predicate that appeared in the lateral view to a pseudo-join predicate and removing the lateral view.

In one embodiment, the first query includes filter predicate(s) outside the first outer join condition. The filter predicate(s) reference column(s). The transformed query may include the filter predicate(s) on a same level as the pseudo-join predicate. For example, the psuedo-join predicate and the filter predicate(s) may both appear in the WHERE clause of the transformed query. The filter predicate(s), if evaluated in the original query or in the transformed query, would eliminate, from a set of rows, rows for which the referenced column is null. However, the pseudo-join predicate, if evaluated in the transformed query, does not eliminate any rows from the set of rows. The pseudo-join predicate, if evaluated in the transformed query, would preserve rows even if a column referenced by the pseudo-join predicate is null and even though the original predicate, if evaluated as a filter predicate for the first outer join in the first query, would have eliminated such rows. In the example, the transformed query is semantically equivalent to the original query because the original predicate, if evaluated, would have preserved such rows and the pseudo-join predicate, if evaluated, would have preserved such rows.

The transformed query may be further transformed into a third query. In one embodiment, the first query is received by an optimizer, and, in response to receiving the first query, the transformed query or the third query is sent to an execution engine for execution. In another embodiment, the first query is received for execution, and, in response, an execution plan is generated for executing the transformed query or the third query instead of the first query. The execution plan may be executed, stored, or sent to an execution engine for execution. In yet another embodiment, the first query is received for execution, and, in response, the transformed query or the third query is executed instead of the first query. The transformed query or the third query may be executed instead of the first query even without rewriting the first query or saving a rewritten copy of the first query.

FIG. 1 illustrates an example process for transforming a query with a single-table join predicate in a first outer join to a semantically equivalent query that includes a multi-table predicate. The process may be carried out by computing device(s) that are specially configured to perform the steps. In the example, a first query is received in step 100. The first query includes a single-table predicate that is part of a first outer join. In step 102, the first query is transformed into a semantically equivalent second query that includes a multi-table predicate corresponding to the single-table predicate. In step 104, execution is caused for the transformed query or for a semantically equivalent third query that has been transformed beyond the transformed query.

Figure 2:
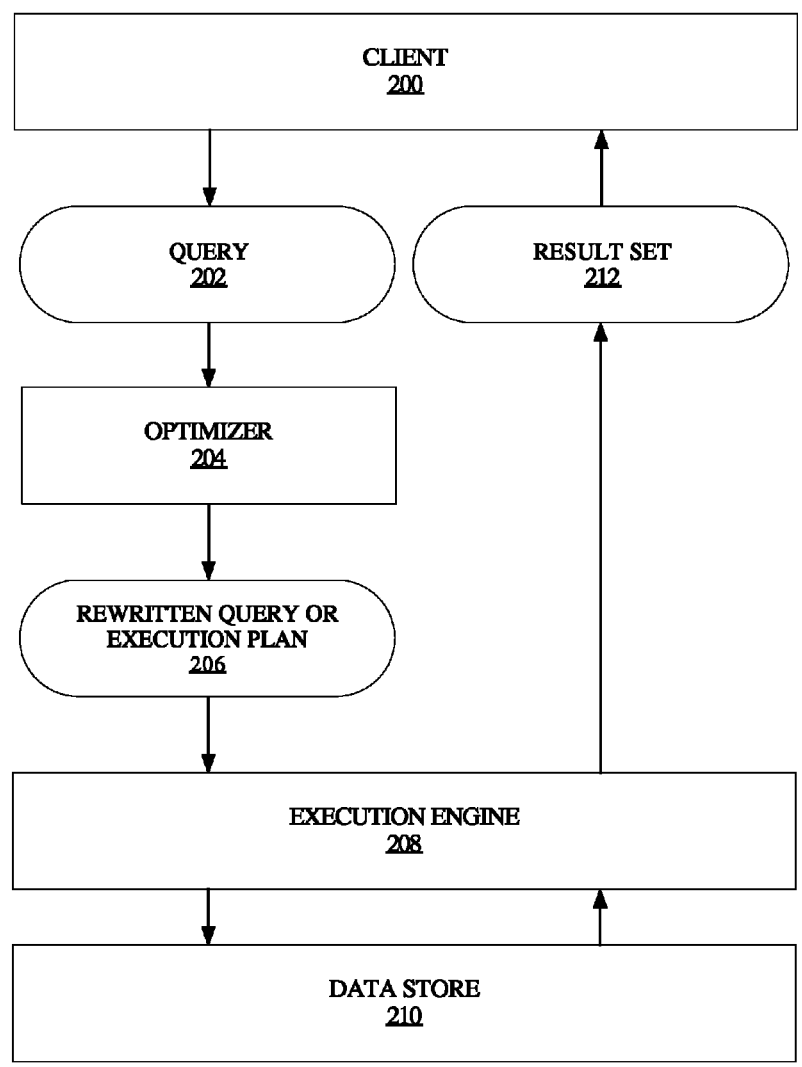
FIG. 2 illustrates an example server-client system for transforming and executing a query.

FIG. 2 illustrates an example server-client system for transforming and executing a query. In the example, client 200 sends a query 202 to optimizer 204. As shown, optimizer 204 is separate from execution engine 208. Optimizer 204 and execution engine 208 may operate on same or different devices and may have a high amount or low amount of integration with each other. Optimizer 204 rewrites the query or generates an execution plan that is based on the query or a transformation of the query. Optimizer sends the rewritten query or execution plan 206 to execution engine 208. Execution engine 208 then executes the rewritten query or execution plan 206 against data store 210 and returns result set 212 to client 200.

Example Transformation of a Single-Table Join Predicate into a Pseudo-Join Predicate High-level concepts have been described for transforming a query with a single-table predicate that appear in a full or left outer join to a semantically equivalent query that includes a multi-table predicate instead of the single-table predicate. Specific examples are provided herein to reinforce and deepen an understanding of these high-level concepts. However, the high-level concepts are not limited by these specific examples.

A query such as Query 6 may be received for execution. Query 6 is an example query that includes a full outer join.

Query 6: Example Syntax for a Full Outer Join
SELECT T1.SSN, T1.name, T2.dname
FROM T1 FULL OUTER JOIN T2
ON (T1.dno=T2.id and T1.salary>$50,000)
WHERE T1.level>7

In Query 6, much like Query 3, the "FULL OUTER JOIN" operator signals that the join operation is a full outer join. The full outer join condition in Query 6 includes both a single-table join predicate and a multi-table join predicate in the ON clause; the predicate, 'T1.salary>$50,000' is a single-table join predicate that references table T1; the predicate, 'T1.dno=T2.dno' is a multi-table join predicate that references table T2. The join predicate in this example produces a result set where rows from T1 are said to match rows from T2 if: (a) the value of the department number ("dno") column in T1 matches the value of the "id" column in T2, and (b) the value of the salary column in T1 is greater than $50,000. If the rows match, values for that row from T1 and values for that row in T2 are added to the result set. Rows from T1 that do not have a matching row in T2 are also added to the result set, except that the column(s) from T2 are null-padded for those rows. Similarly, rows from T2 that do not have a matching row in T1 are added to the result set, except that column(s) from T1 are null-padded for those rows. Separately from the join operation, the result set may be filtered by the filter predicate that removes rows where the level column of T1 is not greater than 7.

Query 6 may be transformed into example Query 7, which includes a representation, internal to the query optimizer and/or the query execution engine, of a full outer-joined view that is semantically equivalent to Query 6. The view may be internally designated as a full outer-joined view by storing an indication that the view is to be fully outer joined, or by including specialized syntax such as "FOJ" in the query.

Query 7: Semantically Equivalent Transform of Query 6
SELECT FOJ.SSN, FOJ.name, FOJ.dname
FROM (SELECT T1.SSN, T1.name, T2.dname FROM T1, T2 WHERE T1.dno=T2.id and T1.salary>$50,000) FOJ
WHERE FOJ.level>7

Applying the filter predicate, V.level>7, on the result of the full-outer-joined view would effectively convert the full outer join into a left outer join, since the filter predicate would remove all null-appended T1 rows. Query 7 may then be expressed as Query 8, which contains a left outer-joined lateral view that "boxes in" the two left outer join predicates and forces them to be evaluated as left outer join predicates.

Query 8: Semantically Equivalent Transform of Query 6 or 7
SELECT T1.SSN, T1.name, V.dname
FROM T1 LATERAL (SELECT V.dname FROM T2 WHERE T1.dno=T2.id and
T1.salary>$50,000) V(+)
WHERE T1.level>7

In Query 8, the "LATERAL" operator causes generation of a lateral view. The "(+)" operator causes a left outer join of table T1 and the lateral view V. Because the lateral view is in the FROM clause and is correlated to T1, the lateral view is evaluated separately for each row of table T1 using the nested-loop join method. For each row of the table T1, the lateral view in this example produces a non-null value when (a) the value of the department number ("dno") column in T1 matches the value of the "id" column in T2, and (b) the value of the salary column in T1 is greater than $50,000. The predicates "T1.dno=T2.id" and "T1.salary>$50,000" in Query 8 correspond to the predicates "T1.dno=T2.id" and "T1.salary>$50,000," meaning that these predicates are present in Query 8 because of their presence in Query 6 if Query 8 results from a transformation of Query 6. In Query 8, these predicates are nested within the lateral view. T1 is joined, row by row, with each result of evaluating the lateral view. After the join operation is complete, the result set is filtered by removing rows where the level column of T1 is not greater than 7.

Query 6, Query 7, or Query 8 may be transformed, directly or indirectly, into example Query 9, which includes a native left outer join and is semantically equivalent to Query 6, Query 7, or Query 8.

QUERY 9: SEMANTICALLY EQUIVALENT TRANSFORM OF QUERY 8
SELECT T1.SSN, T1.name, T2.dname
FROM T1, T2
WHERE T1.dno=T2.id(+) and
 T1.salary>(CASE WHEN T2.id(+) IS NOT NULL THEN $50,000 ELSE $50,000 END) and
 T1.level>7

Query 9 includes a left outer pseudo-join predicate "T1.salary>(CASE WHEN T2.id(+) IS NOT NULL THEN $50,000 ELSE $50,000)". The pseudo-join predicate in Query 9 corresponds to the left outer single-table join predicate, "T1.salary>$50,000," in Query 6. The pseudo-join predicate provides the same results that would be provided with the corresponding join predicate from Query 6 even though the pseudo-join predicate appears in the WHERE clause with the filter predicate, "T1.level>7". If the lateral view was merged without converting the single-table outer join predicate into a pseudo outer join predicate, then the single-table predicate would instead be treated as a filter predicate and would produce an incorrect result, for example, by eliminating null-padded rows. The evaluation of the pseudo-join predicate causes rows to be null-padded and preserved even if the salary value in T1 is not greater than $50,000 for the row. The null-padding is preserved because the pseudo-join predicate references an outer join operation, signaled by "(+)," and references both tables of the outer join, T1 and T2.

The left outer join predicate, "T1.dno=T2.id(+)," in Query 9 corresponds to the full outer join predicate, "T1.dno=T2.id," in Query 6. Because this filter predicate references a left outer join, the filter predicate causes rows of T1 to be null-padded and preserved even if the value of the dno column of T1 is not equal to the value of any id column in T2.

Using Query 9 instead of Query 6, Query 7, or Query 8, the query optimizer may choose an improved execution plan for the query and execute the plan more efficiently, leading to better performance in query execution. In an example experiment, original queries with nested join predicates took several hours to finish while transformed queries that did not have the nested join predicates took a few minutes or less to complete.

Join Methods

A query optimizer may choose from among different available join methods to carry out a join operation. As described herein, some join methods are not available to some query formulations.

In a nested loops join method, a join operation is evaluated on a row-by-row basis. In other words, during a join of T1 and T2, for each row of T1, the execution engine would scan T2 to determine whether T2 satisfies a join condition for that row.

In an index access join method, the execution engine may utilize indexes that existed in a database before the query was received. For example, the database may already include indexes on the columns of T1 and/or T2 that are relevant to the join conditions. The execution engine leverages the index but still looks for these values on a row-by-row basis.

In a sort-merge join method, the execution engine may initially sort data in both of the tables that are being joined. The sorted data may be retained during execution of the query such that the sorted data does not need to be regenerated for each row. The sorted data may also be destroyed or retained once the query has been executed. For example, if evaluating an equality condition such as T1.dno=T2.id for a first row of T1 where T1.dno=5, the execution engine may look in the sorted data for T2.id=5. If the execution engine starts at a value below T2.id=5, the execution may save time by stopping the search once the execution engine reaches a value that is greater than T2.id=5. Similarly, if the execution engine starts at a value above T2.id=5, the execution engine may save time by stopping the search once the execution engine reaches a value that is less than T2.id=5.

In a hash join method, the execution engine may initially create a hash table that hashes values of either T1 into a hash bucket or values of T2 into a hash bucket. The hash tables may be retained during execution of the query such that the hash tables do not need to be regenerated for each row. The hash tables may also be destroyed or retained once the query has been executed. For example, if evaluating an equality condition such as T1.dno=T2.id for a first row of T1 where T1.dno=5, the execution engine may use a hash table to map T1.dno=5 to hash bucket X. The execution engine may look in hash bucket X, which may be significantly smaller than T2, for T2.id=5.

The sort-merge join method and the hash join method both involve a temporary organization of data from the first database object and the second database object, and utilization of the temporary organization of data for evaluation of multiple rows of the join operation. The temporary organization of data may involve the creation of a temporary database object such as a sorted table or a hash table. The temporary database object may be destroyed or retained after the join operation is completed. The nested loops and index access join methods do not create such data during query execution and cannot leverage such data to improve query execution.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
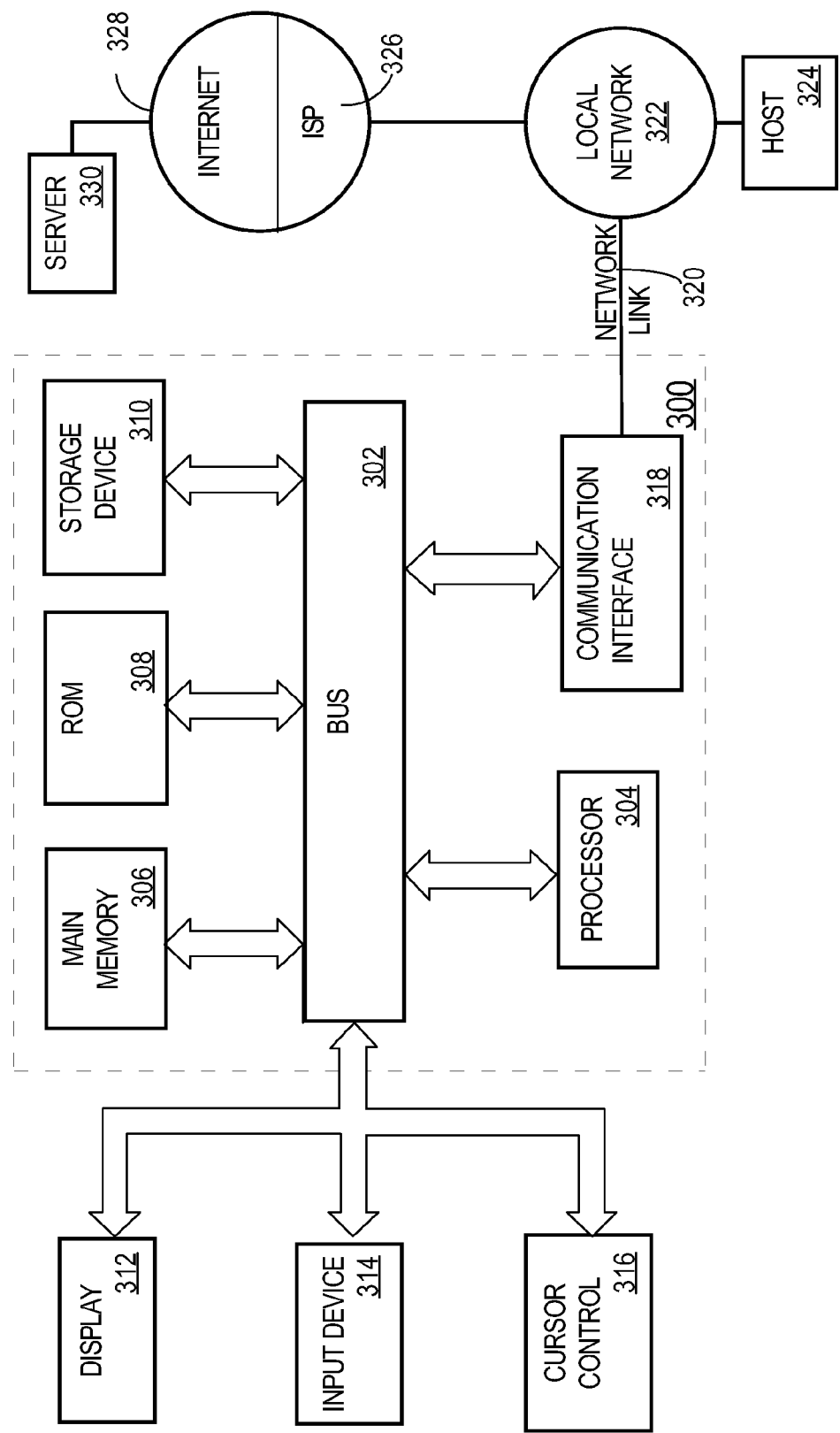
FIG. 3 illustrates an example computer system for performing various combinations of steps described herein.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   transforming a first query to a transformed query;
   wherein the first query includes:
   a first outer join of a first database object and a second database object, and
   a first join predicate that specifies a first condition of the first database object for the first outer join, wherein the first join predicate does not reference the second database object;
   wherein the transformed query does not include the first join predicate but does include:
   a second predicate that specifies a second condition of the first database object, wherein the second predicate references the second database object;
   wherein the transformed query is semantically equivalent to the first query;
   causing execution of the transformed query instead of the first query;
   wherein the method is performed by one or more computing devices.

2. The method of claim 1, wherein the first outer join is a full outer join of the first database object and the second database object, and wherein the second predicate is for a left outer join of the first database object and the second database object.

3. The method of claim 1, wherein the first outer join is a left outer join on a lateral view that references the first database object and the second database object; wherein the first join predicate is nested in the lateral view; and wherein the transformed query does not include the lateral view.

4. The method of claim 1, wherein the first join predicate is in an ON clause of the first outer join.

5. The method of claim 1, wherein the second predicate is in a WHERE clause of the transformed query.

6. The method of claim 1, wherein the first query includes one or more filter predicates outside the first outer join; wherein the one or more filter predicates reference a column; wherein the transformed query includes the one or more filter predicates on a same level as the second predicate; wherein the one or more filter predicates, if evaluated in the first query or in the transformed query, would eliminate, from a set of rows, rows for which the referenced column is null.

7. The method of claim 1, wherein the first join predicate references a column, wherein the first join predicate, if evaluated for the first outer join in the first query, would preserve, from a set of rows, rows for which the referenced column is null; wherein the first join predicate, if evaluated as a filter predicate for the first outer join in the first query, would eliminate, from a set of rows, rows for which the referenced column is null; and wherein the second predicate, if evaluated in the transformed query, would preserve, from a set of rows, rows for which the referenced column is null.

8. The method of claim 1, wherein two or more predicates in the first query, including the first join predicate, reference the first database object but not the second database object, and wherein two or more corresponding predicates in the transformed query reference the first database object and the second database object.

9. The method of claim 1, wherein the second condition is based on whether a value of the second database object is null or not null.

10. The method of claim 1, wherein the first query includes a third predicate that references the first database object and the second database object, wherein the first predicate is in an ON clause of the first query, wherein the transformed query includes a fourth predicate in a WHERE clause of the transformed query, and wherein the fourth predicate is for a left outer join of the transformed query.

11. The method of claim 1, wherein the second predicate is for a left outer join of the first database object and the second database object, wherein the transformed query, if executed, would cause a temporary organization of data from the first database object and the second database object and utilization of the temporary organization of data for evaluation of multiple rows of the left outer join.

12. One or more non-transitory computer-readable storage media storing instructions which, when executed by one or more computing devices, cause:
   transforming a first query to a transformed query;
   wherein the first query includes:
   a first outer join of a first database object and a second database object, and
   a first join predicate that specifies a first condition of the first database object for the first outer join, wherein the first join predicate does not reference the second database object;
   wherein the transformed query does not include the first join predicate but does include:
   a second predicate that specifies a second condition of the first database object, wherein the second predicate references the second database object;
   wherein the transformed query is semantically equivalent to the first query;
   causing execution of the transformed query instead of the first query.

13. The one or more non-transitory computer-readable storage media of claim 12, wherein the first outer join is a full outer join of the first database object and the second database object, and wherein the second predicate is for a left outer join of the first database object and the second database object.

14. The one or more non-transitory computer-readable storage media of claim 12, wherein the first outer join is a left outer join on a lateral view that references the first database object and the second database object; wherein the first join predicate is nested in the lateral view; and wherein the transformed query does not include the lateral view.

15. The one or more non-transitory computer-readable storage media of claim 12, wherein the first join predicate is in an ON clause of the first outer join.

16. The one or more non-transitory computer-readable storage media of claim 12, wherein the second predicate is in a WHERE clause of the transformed query.

17. The one or more non-transitory computer-readable storage media of claim 12, wherein the first query includes one or more filter predicates outside the first outer join; wherein the one or more filter predicates reference a column; wherein the transformed query includes the one or more filter predicates on a same level as the second predicate; wherein the one or more filter predicates, if evaluated in the first query or in the transformed query, would eliminate, from a set of rows, rows for which the referenced column is null.

18. The one or more non-transitory computer-readable storage media of claim 12, wherein the first join predicate references a column, wherein the first join predicate, if evaluated for the first outer join in the first query, would preserve, from a set of rows, rows for which the referenced column is null; wherein the first join predicate, if evaluated as a filter predicate for the first outer join in the first query, would eliminate, from a set of rows, rows for which the referenced column is null; and wherein the second predicate, if evaluated in the transformed query, would preserve, from a set of rows, rows for which the referenced column is null.

19. The one or more non-transitory computer-readable storage media of claim 12, wherein two or more predicates in the first query, including the first join predicate, reference the first database object but not the second database object, and wherein two or more corresponding predicates in the transformed query reference the first database object and the second database object.

20. The one or more non-transitory computer-readable storage media of claim 12, wherein the second condition is based on whether a value of the second database object is null or not null.

21. The one or more non-transitory computer-readable storage media of claim 12, wherein the first query includes a third predicate that references the first database object and the second database object, wherein the first predicate is in an ON clause of the first query, wherein the transformed query includes a fourth predicate in a WHERE clause of the transformed query, and wherein the fourth predicate is for a left outer join of the transformed query.

22. The one or more non-transitory computer-readable storage media of claim 12, wherein the second predicate is for a left outer join of the first database object and the second database object, wherein the transformed query, if executed, would cause a temporary organization of data from the first database object and the second database object and utilization of the temporary organization of data for evaluation of multiple rows of the left outer join.

23. A method comprising:
   transforming a first query to a transformed query;
   wherein the first query includes:
   a first outer join of a first database object and a second database object, and
   a first join predicate that specifies a first condition of the first database object for the first outer join, wherein the first join predicate does not reference the second database object;
   wherein the transformed query does not include the first join predicate but does include:
   a second predicate that specifies a second condition of the first database object, wherein the second predicate references the second database object;
   wherein the transformed query is semantically equivalent to the first query;
   generating an execution plan for executing the transformed query instead of the first query;
   wherein the method is performed by one or more computing devices.

24. The method of claim 23, wherein the first outer join is a full outer join of the first database object and the second database object, and wherein the second predicate is for a left outer join of the first database object and the second database object.

25. The method of claim 23, wherein the first outer join is a left outer join on a lateral view that references the first database object and the second database object; wherein the first join predicate is nested in the lateral view; and wherein the transformed query does not include the lateral view.

26. The method of claim 23, wherein the first join predicate is in an ON clause of the first outer join.

27. The method of claim 23, wherein the second predicate is in a WHERE clause of the transformed query.

28. The method of claim 23, wherein the first query includes one or more filter predicates outside the first outer join; wherein the one or more filter predicates reference a column; wherein the transformed query includes the one or more filter predicates on a same level as the second predicate; wherein the one or more filter predicates, if evaluated in the first query or in the transformed query, would eliminate, from a set of rows, rows for which the referenced column is null.

29. The method of claim 23, wherein the first join predicate references a column, wherein the first join predicate, if evaluated for the first outer join in the first query, would preserve, from a set of rows, rows for which the referenced column is null; wherein the first join predicate, if evaluated as a filter predicate for the first outer join in the first query, would eliminate, from a set of rows, rows for which the referenced column is null; and wherein the second predicate, if evaluated in the transformed query, would preserve, from a set of rows, rows for which the referenced column is null.

30. The method of claim 23, wherein two or more predicates in the first query, including the first join predicate, reference the first database object but not the second database object, and wherein two or more corresponding predicates in the transformed query reference the first database object and the second database object.

31. The method of claim 23, wherein the second condition is based on whether a value of the second database object is null or not null.

32. The method of claim 23, wherein the first query includes a third predicate that references the first database object and the second database object, wherein the first predicate is in an ON clause of the first query, wherein the transformed query includes a fourth predicate in a WHERE clause of the transformed query, and wherein the fourth predicate is for a left outer join of the transformed query.

33. The method of claim 23, wherein the second predicate is for a left outer join of the first database object and the second database object, wherein the transformed query, if executed, would cause a temporary organization of data from the first database object and the second database object and utilization of the temporary organization of data for evaluation of multiple rows of the left outer join.

34. One or more non-transitory computer-readable storage media storing instructions which, when executed by one or more computing devices, cause:
transforming a first query to a transformed query;
wherein the first query includes:
a first outer join of a first database object and a second database object, and
a first join predicate that specifies a first condition of the first database object for the first outer join, wherein the first join predicate does not reference the second database object;
wherein the transformed query does not include the first join predicate but does include:
a second predicate that specifies a second condition of the first database object, wherein the second predicate references the second database object;
wherein the transformed query is semantically equivalent to the first query;
generating an execution plan for executing the transformed query instead of the first query.

35. The one or more non-transitory computer-readable storage media of claim 34, wherein the first outer join is a full outer join of the first database object and the second database object, and wherein the second predicate is for a left outer join of the first database object and the second database object.

36. The one or more non-transitory computer-readable storage media of claim 34, wherein the first outer join is a left outer join on a lateral view that references the first database object and the second database object; wherein the first join predicate is nested in the lateral view; and wherein the transformed query does not include the lateral view.

37. The one or more non-transitory computer-readable storage media of claim 34, wherein the first join predicate is in an ON clause of the first outer join.

38. The one or more non-transitory computer-readable storage media of claim 34, wherein the second predicate is in a WHERE clause of the transformed query.

39. The one or more non-transitory computer-readable storage media of claim 34, wherein the first query includes one or more filter predicates outside the first outer join; wherein the one or more filter predicates reference a column; wherein the transformed query includes the one or more filter predicates on a same level as the second predicate; wherein the one or more filter predicates, if evaluated in the first query or in the transformed query, would eliminate, from a set of rows, rows for which the referenced column is null.

40. The one or more non-transitory computer-readable storage media of claim 34, wherein the first join predicate references a column, wherein the first join predicate, if evaluated for the first outer join in the first query, would preserve, from a set of rows, rows for which the referenced column is null; wherein the first join predicate, if evaluated as a filter predicate for the first outer join in the first query, would eliminate, from a set of rows, rows for which the referenced column is null; and wherein the second predicate, if evaluated in the transformed query, would preserve, from a set of rows, rows for which the referenced column is null.

41. The one or more non-transitory computer-readable storage media of claim 34, wherein two or more predicates in the first query, including the first join predicate, reference the first database object but not the second database object, and wherein two or more corresponding predicates in the transformed query reference the first database object and the second database object.

42. The one or more non-transitory computer-readable storage media of claim 34, wherein the second condition is based on whether a value of the second database object is null or not null.

43. The one or more non-transitory computer-readable storage media of claim 34, wherein the first query includes a third predicate that references the first database object and the second database object, wherein the first predicate is in an ON clause of the first query, wherein the transformed query includes a fourth predicate in a WHERE clause of the transformed query, and wherein the fourth predicate is for a left outer join of the transformed query.

44. The one or more non-transitory computer-readable storage media of claim 34, wherein the second predicate is for a left outer join of the first database object and the second database object, wherein the transformed query, if executed, would cause a temporary organization of data from the first database object and the second database object and utilization of the temporary organization of data for evaluation of multiple rows of the left outer join.

* * * * *

UNITED STATES PATENT AND TRADEMARK OFFICE
CERTIFICATE OF CORRECTION

| | | |
|---|---|---|
| PATENT NO. | : 8,554,761 B1 | Page 1 of 1 |
| APPLICATION NO. | : 13/481722 | |
| DATED | : October 8, 2013 | |
| INVENTOR(S) | : Ahmed | |

It is certified that error appears in the above-identified patent and that said Letters Patent is hereby corrected as shown below:

In the Specifications

In column 7, line 58, delete "psuedo-join" and insert -- pseudo-join --, therefor.

Signed and Sealed this
Eighteenth Day of February, 2014

Michelle K. Lee
*Deputy Director of the United States Patent and Trademark Office*